(12) United States Patent
Dang et al.

(10) Patent No.: US 6,677,395 B1
(45) Date of Patent: Jan. 13, 2004

(54) IRRADIATED, OXIDIZED OLEFIN POLYMER DISPERSING AGENTS

(75) Inventors: Vu A. Dang, Bear, DE (US); Richard J. Fezza, Wilmington, DE (US); Daniel E. Schneckenburger, Chesapeake City, MD (US); Cheng Q. Song, Wilmington, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/305,844

(22) Filed: Nov. 27, 2002

(51) Int. Cl.$^7$ .................................................. C08K 3/04
(52) U.S. Cl. ...................... 524/432; 524/495; 526/348; 526/348.2; 526/348.4; 526/348.6; 526/348.7; 526/437; 526/357; 525/515
(58) Field of Search ................................ 524/432, 495; 526/348, 348.2, 348.4, 348.6, 348.7, 437, 357; 525/515

(56) References Cited

U.S. PATENT DOCUMENTS

| | | | |
|---|---|---|---|
| 3,650,300 A | 3/1972 | Listner | 139/420 |
| 4,604,425 A | 8/1986 | Ohmura et al. | 525/88 |
| 4,960,820 A | 10/1990 | Hwo | 524/528 |
| 5,039,754 A | 8/1991 | Sanchez | 525/333.8 |
| 5,047,446 A | 9/1991 | DeNicola, Jr. | 522/157 |
| 5,079,283 A | 1/1992 | Burditt et al. | 524/94 |
| 5,212,227 A | 5/1993 | Sakazume et al. | 524/504 |
| 5,368,919 A | 11/1994 | Robeson | 428/224 |
| 5,494,988 A | 2/1996 | Sanchez et al. | 526/266 |
| 5,508,318 A | 4/1996 | Comer | 522/112 |
| 5,508,319 A * | 4/1996 | DeNicola, Jr. et al. | 522/161 |
| 5,554,668 A | 9/1996 | Scheve et al. | 522/157 |
| 5,591,785 A | 1/1997 | Scheve et al. | 522/157 |
| 5,688,839 A | 11/1997 | Royce | 523/171 |
| 5,731,362 A | 3/1998 | Scheve et al. | 521/142 |
| 5,804,304 A | 9/1998 | Williams et al. | 428/364 |
| 5,817,707 A | 10/1998 | DeNicola, Jr. et al. | 522/157 |
| 5,820,981 A | 10/1998 | Williams et al. | 428/364 |
| 6,316,532 B1 | 11/2001 | Nozaki et al. | 524/100 |
| 6,337,373 B1 | 1/2002 | Formaro et al. | 525/193 |
| 6,359,077 B1 | 3/2002 | Avgousti et al. | 525/333.8 |
| 6,384,148 B1 | 5/2002 | Herrmann et al. | 525/333.8 |
| 6,444,722 B1 * | 9/2002 | Dang et al. | 522/157 |

FOREIGN PATENT DOCUMENTS

| | | | |
|---|---|---|---|
| DE | 1570353 | 4/1971 | C08F/3/12 |
| EP | 0952182 | 10/1999 | C08K/5/14 |
| JP | 2284940 | 11/1990 | C08L/23/10 |

OTHER PUBLICATIONS

S. Siggia et al., "Organic Peroxides;" *Quantitive Organic Analysis via Functional Groups;* 4$^{th}$Edition, Wiley, NY; Chapter 6, pp. 325–372 (1979).

Application Ser. No. 10/305,816 filed Nov. 27, 2002; "Compatibilizing Agent for Engineering Thermoplastic/Polyolefin Blend" —EL 6067 (US).

Application Ser. No. 10/305,872 filed Nov. 27, 2002; "Irradiated, Oxidized Olefin Polymer Coupling Agents"—EL 6069 (US).

D. Lu et al., *Structure and mechanical properties of isotactic polypropylene and iPP/talc blends functionalized by electron beam irradiation;* Polymer Int.; vol. 49 (1389–1394) 2000.

R. Guan, *Structure and Morphology of Isotactic Polypropylene Functionalized by Electron Beam Irradiation;* Journal of Applied Polymer Science; vol. 76 (75–82) 2000.

\* cited by examiner

*Primary Examiner*—David W. Wu
*Assistant Examiner*—William Cheung

(57) ABSTRACT

Irradiated, oxidized olefin polymer dispersing aids for use in the manufacture of additive concentrates and additive-containing olefin polymer compositions.

13 Claims, No Drawings

IRRADIATED, OXIDIZED OLEFIN POLYMER DISPERSING AGENTS

FIELD OF THE INVENTION

The present invention relates to irradiated, oxidized olefin polymer dispersing aids for use in the manufacture of additive concentrates and additive-containing olefin polymer compositions.

BACKGROUND

The effective use of olefin-based polymers often requires the incorporation of additives into the polymer composition to enhance the polymer's performance, aesthetic appeal and/or impart desirable properties. For example, pigments are often added to meet aesthetic requirements, or to improve heat resistance, heat absorption, and fade resistance. Halogenated flame retardants may be incorporated to improve flame-retardancy in the end-use product. Other additives, such as anti-acids, anti-microbial agents, and conductive carbon black are also often included in polymer compositions.

Improving the dispersion of additives in polymer compositions enhances the performance of those additives. In U.S. Pat. No. 6,384,148, oxidates of polyethylene produced using metallocene catalysts have been disclosed for the dispersion of pigments. In U.S. Pat. No. 5,079,283, organic peroxides and azo compounds were used to promote propylene polymer scission in polypropylene-based compositions containing flame retardants. The resulting higher melt flow material possessed improved flame retardancy. Still another approach to dispersion is to use polyethylene waxes, however, these compounds can result in polymer blooming, and an associated decrease in the useful life of products made from the polymer. Thus, there continues to be a need for improved dispersion of additives in olefin polymer compositions.

The dispersion of additives in olefin polymer compositions using the irradiated, oxidized olefin polymer dispersants of this invention provides a more homogenous distribution of the additive, and promotes desirable flexibility in the formulation of commercial olefin polymer materials. For example, at the same additive concentration, an olefin polymer composition containing an additive dispersed therein using the irradiated, oxidized polymer dispersants of this invention provides improved performance over the same olefin polymer composition without the dispersants of this invention. Alternately, a polymer manufacturer could take advantage of the performance enhancement provided by the irradiated, oxidized polymer dispersants of this invention, by reducing the additive levels in the olefin polymer compositions containing the dispersants, while maintaining equivalent additive performance of the same olefin polymer composition containing higher additive levels without the dispersants of this invention.

The irradiation of olefin polymers has been described in a number of patents. For example, U.S. Pat. No. 5,688,839 discloses irradiating colored olefin polymer resin particles and mixing the irradiated, colored resin particles with a background component, where the colored resin particles only partially disperse, so as to impart a marbleized appearance. U.S. Pat. No. 5,508,319 discloses the irradiation of polyethylene. U.S. Pat. Nos. 5,508,318, 5,554,668, 5,731,362, and 5,591,785 disclose irradiated propylene polymer material having long chain branching, high melt strength, and strain hardening elongational viscosity. U.S. Pat. Nos. 5,820,981 and 5,804,304 disclose a polymer that is subjected to irradiation in the substantial absence of oxygen, followed by a multistage treatment in the presence of a controlled amount of oxygen. However, none of these references disclose irradiated, oxidized olefin polymer dispersing aids for use in the manufacture of additive concentrates and additive-containing olefin polymer compositions. It has unexpectedly been found that the dispersants of the present invention provide distinct advantages in the dispersion of additives in olefin polymer compositions.

SUMMARY OF THE INVENTION

In one embodiment, the present invention relates to an additive-containing olefin polymer composition comprising:
A. 2.0 to 30.0 wt % of an irradiated, oxidized olefin polymer material;
B. 0.1 to 40.0 wt % of an additive selected from the group consisting of colorants, halogenated flame retardants, conductive carbon black, anti-microbial agents, anti-acids and mixtures thereof; and
C. 30.0 to 97.9 wt % of a non-irradiated, non-oxidized olefin polymer material;
wherein the sum of components A+B+C is equal to 100 wt %.

In another embodiment, the present invention relates to an additive concentrate composition, the composition comprising:
A. 9.0 to 85.0 wt % of an additive selected from the group consisting of colorants, halogenated flame retardants, conductive carbon black, anti-microbial agents, anti-acids and mixtures thereof; and
B. 15 to 91 wt % of an irradiated, oxidized olefin polymer material;
wherein the sum of components A+B is equal to 100 wt %.

DETAILED DESCRIPTION OF THE INVENTION

Suitable olefin polymers useful as the irradiated and oxidized or non-irradiated and non-oxidized olefin polymers are propylene polymer materials, ethylene polymer materials, butene-1 polymer materials, and mixtures thereof.

When a propylene polymer material is used as the non-irradiated and non-oxidized olefin polymer material or as the starting material for making the irradiated, oxidized olefin polymer of the present invention, the propylene polymer material can be:

(A) a crystalline homopolymer of propylene having an isotactic index greater than 80%, preferably about 90% to about 99.5%;

(B) a crystalline random copolymer of propylene and an olefin selected from the group consisting of ethylene and $C_4$–$C_{10}$ α-olefins, provided that when the olefin is ethylene, the maximum polymerized ethylene content is 10% by weight, preferably about 4%, and when the olefin is a $C_4$–$C_{10}$ α-olefin, the maximum polymerized content thereof is 20% by weight, preferably about 16%, the copolymer having an isotactic index greater than 60%, preferably at least 70%;

(C) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, preferably about 16%, and when ethylene is one of the olefins, the maximum polymerized ethylene content is 5% by weight, preferably about 4%, the terpolymer having an isotactic index greater than 85%;

(D) an olefin polymer composition comprising:
(i) about 10 parts to about 60 parts by weight, preferably about 15 parts to about 55 parts, of a crystalline propylene homopolymer having an isotactic index at least 80%, preferably about 90 to about 99.5%, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, preferably about 90% to about 99%, and an isotactic index greater than 60%;
(ii) about 3 parts to about 25 parts by weight, preferably about 5 parts to about 20 parts, of a copolymer of ethylene and propylene or a $C_4$–C8 α-olefin that is insoluble in xylene at ambient temperature; and
(iii) about 10 parts to about 80 parts by weight, preferably about 15 parts to about 65 parts, of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight, preferably about 10% to about 60%, most preferably about 12% to about 55%, of ethylene and being soluble in xylene at ambient temperature and having an intrinsic viscosity of about 1.5 to about 4.0 dl/g;
the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages;

(E) a thermoplastic olefin comprising:
(i) about 10% to about 60%, preferably about 20% to about 50%, of a propylene homopolymer having an isotactic index at least 80%, preferably 90–99.5% or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 60%;
(ii) about 20% to about 60%, preferably about 30% to about 50%, of an amorphous copolymer selected from the group consisting of (a) ethylene and propylene, (b) ethylene, propylene, and a $C_4$–$C_8$ α-olefin, and (c) ethylene and a α-olefin, the copolymer optionally containing about 0.5% to about 10% of a diene, and containing less than 70% ethylene and being soluble in xylene at ambient temperature; and
(iii) about 3% to about 40%, preferably about 10% to about 20%, of a copolymer of ethylene and propylene or an α-olefin that is insoluble in xylene at ambient temperature; and (F) mixtures thereof.

When an ethylene polymer material is used as the non-irradiated and non-oxidized olefin polymer material or as the starting material for making the irradiated, oxidized olefin polymer of the present invention, the ethylene polymer material is selected from the group consisting of (a) homopolymers of ethylene, (b) random copolymers of ethylene and an alpha-olefin selected from the group consisting of $C_{3-10}$ alpha-olefins having a maximum polymerized alpha-olefin content of about 20 wt %, preferably a maximum of about 16 wt %, by weight, (c) random terpolymers of ethylene and said alpha-olefins, provided that the maximum polymerized alpha-olefin content is about 20 wt %, preferably the maximum is about 16 wt %, by weight, and (d) mixtures thereof. The $C_{3-10}$ alpha-olefins include the linear and branched alpha-olefins such as, for example, propylene, 1-butene, isobutylene, 1-pentene, 3-methyl-1-butene, 1-hexene, 3,4-dimethyl-1-butene, 1-heptene, 3-methyl-1-hexene, 1-octene and the like.

When the ethylene polymer is an ethylene homopolymer, it typically has a density of 0.89 g/cm$^3$ or greater, and when the ethylene polymer is an ethylene copolymer with a $C_{3-10}$ alpha-olefin, it typically has a density of 0.91 g/cm$^3$ or greater but less than 0.94 g/cm$^3$. Suitable ethylene copolymers include ethylene/butene-1, ethylene/hexene-1, ethylene/octene-1 and ethylene/4-methyl-1-pentene. The ethylene copolymer can be a high density ethylene copolymer or a short chain branched linear low density ethylene copolymer (LLDPE), and the ethylene homopolymer can be a high density polyethylene (HDPE) or a low density polyethylene (LDPE). Typically the LLDPE and LDPE have densities of 0.910 g/cm$^3$ or greater to less than 0.940 g/cm$^3$ and the HDPE and high density ethylene copolymer have densities of greater than 0.940 g/cm$^3$, usually 0.95 g/cm$^3$ or greater. In general, ethylene polymer materials having a density from 0.89 to 0.97 g/cm$^3$ are suitable for use in the practice of this invention. Preferably the ethylene polymers are LLDPE and HDPE having a density from 0.89 to 0.97 g/cm$^3$.

When a butene-1 polymer material is used as the non-irradiated and non-oxidized olefin polymer material or as the starting material for making the irradiated, oxidized olefin polymer of the present invention, the butene-1 polymer material is selected from a normally solid, high molecular weight, predominantly crystalline butene-1 polymer material selected from the group consisting of:
(1) a homopolymer of butene-1;
(2) a copolymer or terpolymer of butene-1 with a non-butene alpha-olefin comonomer content of 1–15 mole %, preferably 1–10 mole %; and
(3) mixtures thereof.

Typically the non-butene alpha-olefin comonomer is ethylene, propylene, a $C_{5-8}$ alpha-olefin or mixtures thereof.

The useful polybutene-1 homo or copolymers can be isotactic or syndiotactic and have a melt flow rate (MFR) from about 0.5 to 150, preferably from about 0.5 to 100, and most preferably from 0.5 to 75 g/10 min.

These poly-1 -butene polymers, their methods of preparation, and their properties are known in the art. An exemplary reference containing additional information on polybutylene-1 is U.S. Pat. No. 4,960,820, the disclosures of which are incorporated herein by reference.

Suitable polybutene-1 polymers can be obtained, for example, by Ziegler-Natta low-pressure polymerization of butene-1, e.g. by polymerizing butene-1 with catalysts of $TiCl_3$ or $TiCl_3$—$AlCl_3$ and $Al(C_2H_5)_2Cl$ at temperatures of 10–100° C., preferably 20–40° C., e.g., according to the process described in DE-A-1,570,353. It can also be obtained, for example, by using $TiCl_4$—$MgCl_2$ catalysts. High melt indices are obtainable by further processing of the polymer by peroxide cracking or visbreaking, thermal treatment or irradiation to induce chain scissions leading to a higher MFR material.

Preferably, the polybutene-1 contains up to 15 mole % of copolymerized ethylene or propylene, but more preferably it is a homopolymer, for example, Polybutene PB0300 homopolymer marketed by Basell USA Inc. This polymer is a homopolymer with a melt flow of 11 g/10 min. at 230° C. and 2.16 kg and a weight average molecular weight of 270,000 dalton.

Preferably, the polybutene-1 homopolymer has a crystallinity of at least 55% by weight measured with wide-angle X-ray diffraction after 7 days. Typically the crystallinity is less than 70%, preferably less than 60%.

The non-irradiated, non-oxidized olefin polymer material and the starting material for the irradiated and oxidized olefin polymer material can be the same or different from each other.

The olefin polymer starting material for the irradiated, oxidized olefin polymer is exposed to high-energy ionizing radiation under a blanket of inert gas, preferably nitrogen. The ionizing radiation should have sufficient energy to penetrate the mass of polymer material being irradiated to the extent desired. The ionizing radiation can be of any kind, but preferably includes electrons and gamma rays. More preferred are electrons beamed from an electron generator having an accelerating potential of 500–4,000 kilovolts. Satisfactory results are obtained at a dose of ionizing radiation of about 0.1 to about 15 megarads ("Mrad"), preferably about 0.5 to about 9.0 Mrad.

The term "rad" is usually defined as that quantity of ionizing radiation that results in the absorption of 100 ergs of energy per gram of irradiated material regardless of the source of the radiation using the process described in U.S. Pat. No. 5,047,446. Energy absorption from ionizing radiation is measured by the well-known convention dosimeter, a measuring device in which a strip of polymer film containing a radiation-sensitive dye is the energy absorption sensing means. Therefore, as used in this specification, the term "rad" means that quantity of ionizing radiation resulting in the absorption of the equivalent of 100 ergs of energy per gram of the polymer film of a dosimeter placed at the surface of the olefin material being irradiated, whether in the form of a bed or layer of particles, or a film, or a sheet.

The irradiated olefin polymer material is then oxidized in a series of steps. The first treatment step consists of heating the irradiated polymer in the presence of a first controlled amount of active oxygen greater than 0.004% by volume but less than 15% by volume, preferably less than 8% by volume, more preferably less than 5% by volume, and most preferably from 1.3% to 3.0% by volume, to a first temperature of at least 25° C. but below the softening point of the polymer, preferably about 25° C. to 1400,more preferably about 25° C. to 100° C., and most preferably about 40° C. to 80° C. Heating to the desired temperature is accomplished as quickly as possible, preferably in less than 10 minutes. The polymer is then held at the selected temperature, typically for about 5 to 90 minutes, to increase the extent of reaction of the oxygen with the free radicals in the polymer. The holding time, which can be determined by one skilled in the art, depends upon the properties of the starting material, the active oxygen concentration used, the irradiation dose, and the temperature. The maximum time is determined by the physical constraints of the fluid bed.

In the second treatment step, the irradiated polymer is heated in the presence of a second controlled amount of oxygen greater than 0.004% by volume but less than 15% by volume, preferably less than 8% by volume, more preferably less than 5% by volume, and most preferably from 1.3% to 3.0% by volume to a second temperature of at least 25° C. but below the softening point of the polymer. Preferably, the second temperature is from 100° C. to less than the softening point of the polymer, and greater than the first temperature of the first step. The polymer is then held at the selected temperature and oxygen concentration conditions, typically for about 90 minutes, to increase the rate of chain scission and to minimize the recombination of chain fragments so as to form long chain branches, i.e., to minimize the formation of long chain branches. The holding time is determined by the same factors discussed in relation to the first treatment step.

In the optional third step, the oxidized olefin polymer material is heated under a blanket of inert gas, preferably nitrogen, to a third temperature of at least 80° C. but below the softening point of the polymer, and held at that temperature for about 10 to about 120 minutes, preferably about 60 minutes. A more stable product is produced if this step is carried out. It is preferred to use this step if the irradiated, oxidized olefin polymer material is going to be stored rather than used immediately, or if the radiation dose that is used is on the high end of the range described above. The polymer is then cooled to a fourth temperature of about 70° C. over a period of about 10 minutes under a blanket of inert gas, preferably nitrogen, before being discharged from the bed. In this manner, stable intermediates are formed that can be stored at room temperature for long periods of time without further degradation.

The preferred method of carrying out the treatment is to pass the irradiated polymer through a fluid bed assembly operating at a first temperature in the presence of a first controlled amount oxygen, passing the polymer through a second fluid bed assembly operating at a second temperature in the presence of a second controlled amount of oxygen, and then maintaining the polymer at a third temperature under a blanket of nitrogen, in a third fluid bed assembly. In commercial operation, a continuous process using separate fluid beds for the first two steps, and a purged, mixed bed for the third step is preferred. However, the process can also be carried out in a batch mode in one fluid bed, using a fluidizing gas stream heated to the desired temperature for each treatment step. Unlike some techniques, such as melt extrusion methods, the fluidized bed method does not require the conversion of the irradiated polymer into the molten state and subsequent re-solidification and comminution into the desired form. The fluidizing medium can be, for example, nitrogen or any other gas that is inert with respect to the free radicals present, e.g., argon, krypton, and helium.

As used in this specification, the expression "room temperature" or "ambient" temperature means approximately 25° C. The expression "active oxygen" means oxygen in a form that will react with the irradiated olefin polymer material. It includes molecular oxygen, which is the form of oxygen normally found in air. The active oxygen content requirement of this invention can be achieved by replacing part or all of the air in the environment by an inert gas such as, for example, nitrogen.

The concentration of peroxide groups formed on the polymer can be controlled easily by varying the radiation dose during the preparation of the irradiated polymer and the amount of oxygen to which such polymer is exposed after irradiation. The oxygen level in the fluid bed gas stream is controlled by the addition of dried, filtered air at the inlet to the fluid bed. Air must be constantly added to compensate for the oxygen consumed by the formation of peroxides in the polymer.

The irradiated, oxidized olefin polymer material of the invention contains peroxide linkages that degrade during compounding to form various oxygen-containing polar functional groups, e.g., acids, ketones and esters. In addition, the number average and weight average molecular weight of the irradiated, oxidized olefin polymer is usually much lower than that of the corresponding olefin polymer used to prepare same, due to the chain scission reactions during irradiation and oxidation.

Preferably, the non-irradiated and non-oxidized olefin polymer and the starting material for making the irradiated, oxidized olefin polymer material is a propylene polymer material, more preferably a propylene homopolymer having an isotactic index greater than 80%.

Suitable additives include colorants, halogenated flame retardants, anti-microbial agents, anti-acids, conductive carbon black and mixtures thereof. Typically these additives have a particle size of less than 5 micron.

In the additive-containing olefin polymer composition, the additives can be present in an amount from 0.1 to 40 wt %, preferably 0.1 to 30 wt %, more preferably 0.3 to 12%. The irradiated, oxidized olefin polymer material can be present in an amount from 2.0 to 30.0 wt %, preferably 2.0 to 25 wt %, more preferably 2.0 to 20 wt %. The balance of the composition up to 100 wt % is the non-irradiated, non-oxidized olefin polymer material.

When the additive is a colorant, the colorant is preferably present in an amount from 0.1 to 5 wt %, more preferably 0.3 to 1.5 wt %. Typical examples include those organic or inorganic pigments commonly used with polyolefins such as carbon black, titanium oxide, graphite or color index (C.I.) pigment yellow series 62, 139, 151, 155, 169, 180, 181, 191, 194; C.I. pigment red series 122, 144, 149, 170, 175, 176, 185, 187, 209, 214, 242, 247, 262, 48:2, 48:3, 53:1, 57:1; C.I. pigment orange series 38,43, 68, 72; C.I. pigment violet series 19, 23; C.I. pigment blue series 15:1, 15:3, 15:4; C.I. pigment brown series 25 and 41, C.I. pigment green series 7, and phthalocyanine blue. The irradiated, oxidized olefin polymer material is preferably present in an amount from 2 to 30 wt %, more preferably 2 to 20 wt %. The balance of the composition is the non-irradiated, non-oxidized olefin polymer material.

When the additive is a halogenated flame retardant composition, the flame retardant composition includes a halogenated compound first component and a second component that interacts with the halogenated compound to form an intermediate compound. The halogenated compounds can include, for example, aliphatic, cycloaliphatic and aromatic bromine or chlorine compounds, such as tetrachlorobisphenol A, dibromopentaerythritol, hexabromocyclododecane, octabromodiphenyl ether, decabromodiphenyl ether (pentabromophenyl ether), hexabromobenzene, poly (tribromostyrene), pentabromodiphenyl ether, tribromophenyl-allyl ether, ethylene bis(tribromophenyl ether), bis(dibromopropyl)ether of tetrabromobisphenol A, tetrabromobisphenol A, tetrabromophthalic anhydride, dibromoneopentylglycol, and poly(dibromophenylene oxide). The second component can include compounds such as antimony trioxide, boron compounds, tin oxide, zinc oxide, zinc borate, aluminum trioxide, aluminum trihydroxide and mixtures thereof. The halogenated compound first component is preferably present in an amount from 2.0 to 30 wt %, more preferably from 2.0 to 20 wt %, most preferably 2.0 to 10 wt %. The second component is preferably present in an amount from 0.5 to 10 wt %, more preferably 0.5 to 7.0 wt %, most preferably 0.5 to 3 wt %. The irradiated, oxidized olefin polymer material is preferably present in an amount from 2.0 to 30.0 wt %, more preferably 2 to 25 wt %, most preferably 2 to 20 wt %. The balance of the composition is the non-irradiated, non-oxidized olefin polymer material.

Typical anti-acids include calcium stearate, hydrotalcite, zinc stearate, calcium oxide, and sodium stearate. Typical anti-microbial agents include compounds such as silver oxide.

The non-irradiated, non-oxidized olefin polymer material, additives, and irradiated, oxidized olefin polymer material can be combined at ambient temperature in conventional operations well known in the art; including, for example, drum tumbling, or with low or high speed mixers. The resulting composition is then compounded in the molten state to disperse the additive in any conventional manner well known in the art, in batch or continuous mode; for example, by using a Banbury mixer, a kneading machine, or a single or twin screw extruder. The material can then be pelletized.

When producing an additive concentrate, the additive is present in an amount from 9.0 to 85.0 wt %, preferably 9.0 to 40.0 wt %, more preferably 9 to 15 wt %. The balance of the composition up to 100 wt % is the irradiated, oxidized olefin polymer material.

When producing an additive concentrate where the additive is a colorant, the colorant is preferably present in an amount from 10 to 70 wt %, more preferably 10 to 55 wt %. Suitable types of colorants are as described above.

When producing an additive concentrate where the additive is a halogenated flame retardant composition, the halogenated compound first component is preferably present in an amount from 7.0 to 65 wt %, more preferably from 7.0 to 60 wt %. The second component is preferably present in an amount from 2.0 to 20 wt %. The balance of the concentrate is the irradiated, oxidized olefin polymer material. Typical types of the first and second components of the halogenated flame retardant composition are as described above.

The irradiated, oxidized olefin polymer material and additives can be combined and compounded in the manner as described above.

Unless otherwise specified, the properties of the olefin polymer materials, compositions and concentrates that are set forth in the following examples have been determined according to the test methods set forth in Table I below.

TABLE I

| | |
|---|---|
| Melt Flow Rate ("MFR") | ASTM D1238, units of dg/min<br>Propylene polymer material: (230° C.; 2.16 kg)<br>Ethylene polymer material: (190° C.; 2.16 kg)<br>Butene-1 polymer material: (230° C.; 2.16 kg) |
| Colorant dispersion testing | ASTM E1347 |
| Flammability testing | Underwriters Laboratories Inc. UL-94 procedure for vertical test burning |
| Isotactic Index, ("I.I.") | Defined as the percent of olefin polymer insoluble in xylene. The weight percent of olefin polymer soluble in xylene at room temperature is determined by dissolving 2.5 g of polymer in 250 ml of xylene at room temperature in a vessel equipped with a stirrer, and heating at 135° C. with agitation for 20 minutes. The solution is cooled to 25° C. while continuing the agitation, and then left to stand without agitation for 30 minutes so that the solids can settle. The solids are filtered with filter |

TABLE I-continued

| | |
|---|---|
| | paper, the remaining solution is evaporated by treating it with a nitrogen stream, and the solid residue is vacuum dried at 80° C. until a constant weight is reached. These values correspond substantially to the isotactic index determined by extracting with boiling n-heptane, which by definition constitutes the isotactic index of polypropylene. |
| Peroxide Concentration | Quantitative Organic Analysis via Functional Groups, by S. Siggia et al., 4th Ed., NY, Wiley 1979, pp. 334–42 |

Unless otherwise specified, all references to parts, percentages and ratios in this specification refer to percentages by weight.

EXAMPLE 1

This example illustrates a general procedure for preparing an irradiated, oxidized propylene polymer. A polypropylene homopolymer having an MFR of 0.7 dg/min and I.I. of 95.6% commercially available from Basell USA Inc. was irradiated at 0.5 Mrad under a blanket of nitrogen. The irradiated polymer was then treated with 2.5% by volume of oxygen at 55° C. for 60 minutes and then with 2.5% by volume of oxygen at 140° C. for an additional 60 minutes. The oxygen was then removed. The polymer was then heated at 140° C. under a blanket of nitrogen for 90 minutes, cooled and collected. The MFR of the resultant polymer material was 1300 dg/min. The peroxide concentration was 28 mmol/kg of polymer.

EXAMPLE 2

An irradiated, oxidized propylene polymer was prepared from a propylene homopolymer, commercially available from Basell USA Inc., having an MFR of 0.12 and I.I. of 95.6% according to the procedure of Example 1, except that the homopolymer was irradiated at 1.0 Mrad. The irradiated polymer was then treated with 2.5% by volume of oxygen at 60° C. for 60 minutes and then with 2.5% by volume of oxygen at 140° C. for another 60 minutes. The MFR of the resulting polymer material was 10000 dg/min.

EXAMPLE 3

An irradiated, oxidized propylene polymer was prepared from a propylene homopolymer, commercially available from Basell USA Inc., having an MFR of 0.12 and I.I. of 95.6% according to the procedure of Example 2,except that the irradiated polymer was treated with 1.8% by volume of oxygen at 60° C. for 60 minutes and then with 1.8% by volume of oxygen at 140° C. for another 60 minutes. The MFR of the resulting material was 343 dg/min.

EXAMPLE 4

An irradiated, oxidized propylene polymer was prepared from a propylene homopolymer, commercially available from Basell USA Inc., having an MFR of 0.48 and I.I. index of 95.4%, according to the procedure of Example 1, except that the irradiated polymer was treated with 1.35% by volume of oxygen at 80° C. for 5 minutes and then with 1.30% by volume of oxygen at 140° C. for another 60 min. The MFR of the resulting polymer material was 18 dg/min. The peroxide concentration was 8.2 mmole/kg of polymer.

EXAMPLE 5

An irradiated, oxidized propylene polymer was prepared from a propylene homopolymer, commercially available from Basell USA Inc., having an MFR of 12.6 and I.I. of 95.0%, according to the procedure of Example 1, except that the irradiated polymer was treated with 1.60% by volume of oxygen at 80° C. for 5 minutes and then with 1.60% by volume of oxygen at 140° C. for another 60 min. The MFR of the resulting polymer material was 310 dg/min. The peroxide concentration was 17.1 mmole/kg of polymer.

EXAMPLE 6

An irradiated, oxidized propylene polymer was prepared from a propylene homopolymer commercially available from Basell USA Inc., having an MFR of 0.48 and I.I. of 95.4%, according to the procedure of Example 1, except that the irradiated polymer was treated with 3.0% by volume of oxygen at 80° C. for 5 minutes and then with 3.0% by volume of oxygen at 140° C. for another 60 min. The MFR of the resulting polymer material was 2500 dg/min. The peroxide concentration was 61.0 mmole/kg of polymer.

EXAMPLE 7

An irradiated, oxidized ethylene polymer was prepared from a random copolymer of ethylene and butene, with a butene content of 9%, having an MFR of 2.1 dg/min and density of 0.916 g/cm$^3$ commercially available from Haladia Petrochemicals LTD. The copolymer was irradiated at 1.0 Mrad under a blanket of nitrogen. The irradiated polymer was then treated with 5.0% by volume of oxygen at ambient temperature for 60 minutes and then with 5.0% by volume of oxygen at 110° C. for an additional 60 minutes. The oxygen was then removed. The polymer was then heated at 110° C. under a blanket of nitrogen for 60 minutes, cooled and collected. The MFR of the resultant polymer material was 7.9 dg/min.

EXAMPLE 8

An irradiated, oxidized propylene polymer was prepared from a propylene homopolymer commercially available from Basell USA Inc., having an MFR of 0.7 dg/min and I.I. of 95.6%, according to the procedure of Example 1,except that the irradiated polymer was then treated with 1.9% by volume of oxygen at 60° C. for 60 minutes and then with 1.9% by volume of oxygen at 130° C. for an additional 60 minutes. The oxygen was then removed. The polymer was then heated at 130° C. under a blanket of nitrogen for 90 minutes, cooled and collected. The MFR of the resultant polymer material was 498 dg/min. The peroxide concentration was 25 mmol/kg of polymer.

Unless otherwise indicated, all extrusion conditions were conducted using a 1.5" Wayne single-screw extruder, commercially available from Wayne Machine & Die Company, with a barrel temperature of 232.2° C. and a screw speed of 60 r.p.m.

Compositions were prepared using phthalocyanine green #7 (16-2024 PV Fast Green GNX), commercially available from Clariant International Ltd., having a particle size of 50 nm, to evaluate pigment dispersion efficiency in a propylene homopolymer using various levels of irradiated, oxidized propylene polymer.

The compositions for Control Example 9 and Examples 10–16 are set forth in Table II.

TABLE II

|  | Control Ex. 9 | Examples | | | | | | |
|---|---|---|---|---|---|---|---|---|
|  |  | 10 | 11 | 12 | 13 | 14 | 15 | 16 |
| Non-irradiated, non-oxidized propylene homopolymer, wt % MFR = 12.6, I.I. = 95% | 98.84 | 97.86 | 96.87 | 93.90 | 88.96 | 79.07 | 97.86 | 88.96 |
| Irradiated, oxidized propylene of Example 1, wt % |  | 0.99 | 1.98 | 4.94 | 9.88 | 19.77 |  |  |
| Irradiated, oxidized propylene of Example 3, wt % |  |  |  |  |  |  | 0.99 | 9.88 |
| Green#7, 16-2024 PV Fast Green GNX, wt % | 0.99 | 0.99 | 0.99 | 0.99 | 0.99 | 0.99 | 0.99 | 0.99 |
| Irganox B225 antioxidant[1], wt % | 0.12 | 0.12 | 0.12 | 0.12 | 0.12 | 0.12 | 0.12 | 0.12 |
| Calcium stearate, wt % | 0.05 | 0.05 | 0.05 | 0.05 | 0.05 | 0.05 | 0.05 | 0.05 |

[1]Irganox B225 is a blend of 1 part Irganox-1010 stabilizer and 1 part Irgafos phosphite, commercially available from Ciba Specialty Chemicals Corporation.

The color dispersion test results for Control Example 9 and for Examples 10–16 are set forth in Table III.

TABLE III

| Ex. | L | a | b | Delta L | Delta a | Delta b |
|---|---|---|---|---|---|---|
| Control Ex. 9 | 26.503 | −4.486 | −3.558 |  |  |  |
| 10 | 26.494 | −4.456 | −3.572 | −0.009 | 0.03 | −0.014 |
| 11 | 26.53 | −4.545 | −3.605 | 0.027 | −0.059 | −0.047 |
| 12 | 26.606 | −4.736 | −3.651 | 0.103 | −0.25 | −0.093 |
| 13 | 26.612 | −4.849 | −3.593 | 0.109 | −0.363 | −0.035 |
| 14 | 26.635 | −5.038 | −3.591 | 0.132 | −0.552 | −0.033 |
| 15 | 26.563 | −4.536 | −3.671 | 0.06 | −0.05 | −0.113 |

TABLE III-continued

| Ex. | L | a | b | Delta L | Delta a | Delta b |
|---|---|---|---|---|---|---|
| 16 | 26.65 | −4.85 | −3.633 | 0.147 | −0.364 | −0.075 |

The degree of pigment dispersion was evaluated by comparing the "Delta a" value of each sample relative to the Control, where a more negative "Delta a" value indicates greener color. As is evident from the data in Table III, the addition of the irradiated, oxidized propylene polymer dipersants of this invention improved the pigment dispersion over a range of concentrations.

Examples 17 to 38 demonstrate the use of the irradiated, oxidized propylene polymer dispersants of this invention for reducing pigment levels in a propylene polymer composition. In these examples, a yellow shade red pigment (13-3415 Graphtol Red), having a particle size of 125 nm, commercially available from Clariant International Ltd. was used.

The compositions for Control Example 17 and Examples 18–23 are set forth in Table IV.

TABLE IV

|  | Control Ex. 17 | Examples | | | | | |
|---|---|---|---|---|---|---|---|
|  |  | 18 | 19 | 20 | 21 | 22 | 23 |
| Non-irradiated, non-oxidized propylene homopolymer, wt % MFR = 12.6, I.I. = 95%, wt % | 98.84 | 88.96 | 89.05 | 89.14 | 89.22 | 89.31 | 89.40 |
| Irradiated, oxidized propylene of Example 1, wt % |  | 9.88 | 9.89 | 9.90 | 9.91 | 9.92 | 9.93 |
| Yellow shade red (13-3415 Graphtol Red LG), wt % | 0.99 | 0.99 | 0.89 | 0.79 | 0.69 | 0.60 | 0.50 |
| Irganox B225 antioxidant[1], wt % | 0.12 | 0.12 | 0.12 | 0.12 | 0.12 | 0.12 | 0.12 |
| Calcium stearate, wt % | 0.05 | 0.05 | 0.05 | 0.05 | 0.05 | 0.05 | 0.05 |

[1]Irganox B225 is a blend of 1 part Irganox-1010 stabilizer and 1 part Irgafos phosphite, commercially available from Ciba Specialty Chemicals Corporation.

The compositions for Examples 24–26 are set forth in Table V.

TABLE V

| Examples | 24 | 25 | 26 |
|---|---|---|---|
| Non-irradiated, non-oxidized propylene homopolymer, wt %; MFR = 12.6, I.I. = 95% | 88.96 | 89.14 | 89.40 |
| Irradiated, oxidized propylene of Example 3, wt % | 9.88 | 9.90 | 9.93 |
| Yellow shade red (13-3415 Graphtol Red LG), wt % | 0.99 | 0.79 | 0.50 |

TABLE V-continued

| Examples | 24 | 25 | 26 |
|---|---|---|---|
| Irganox B225 antioxidant[1], wt % | 0.12 | 0.12 | 0.12 |
| Calcium stearate, wt % | 0.05 | 0.05 | 0.50 |

[1]Irganox B225 is a blend of 1 part Irganox-1010 stabilizer and 1 part Irgafos phosphite, commercially available from Ciba Specialty Chemicals Corporation.

The compositions for Examples 27–32 are set forth in Table VI.

TABLE VI

| | Examples | | | | | |
|---|---|---|---|---|---|---|
| | 27 | 28 | 29 | 30 | 31 | 32 |
| Non-irradiated, non-oxidized propylene homopolymer, wt %; MFR = 12.6, I.I. = 95% | 88.96 | 88.96 | 89.14 | 89.40 | 89.49 | 89.58 |
| Irradiated, oxidized propylene of Example 1, wt % | 9.88 | | | | | |
| Irradiated, oxidized propylene of Example 2, wt % | | 9.88 | 9.90 | 9.93 | 9.94 | 9.95 |
| Yellow shade red (13-3415 Graphtol Red LG), 25%, wt % | 0.99 | 0.99 | 0.79 | 0.50 | 0.40 | 0.30 |
| Irganox B225 antioxidant[1], wt % | 0.12 | 0.12 | 0.12 | 0.12 | 0.12 | 0.12 |
| Calcium stearate, wt % | 0.05 | 0.05 | 0.05 | 0.05 | 0.05 | 0.05 |

[1]Irganox B225 is a blend of 1 part Irganox-1010 stabilizer and 1 part Irgafos phosphite, commercially available from Ciba Specialty Chemicals Corporation.

The compositions for Control Example 33 and Examples 34–38 are set forth in Table VII.

TABLE VII

| Examples | Control Ex. 33 | 35 | 36 | 37 | 38 |
|---|---|---|---|---|---|
| Non-irradiated, non-oxidized propylene homopolymer, wt % MFR = 12.6, I.I. = 95% | 98.84 | 93.90 | 94.09 | 94.37 | 94.46 | 94.56 |
| Irradiated, oxidized propylene of Example 1, wt % | | 4.94 | 4.95 | 4.97 | 4.97 | 4.98 |
| Yellow shade red (13-3415 Graphtol Red LG), wt % | 0.99 | 0.99 | 0.79 | 0.50 | 0.40 | 0.3 |
| Irganox B225 antioxidant[1], wt % | 0.12 | 0.12 | 0.12 | 0.12 | 0.12 | 0.12 |
| Calcium stearate, wt % | 0.05 | 0.05 | 0.05 | 0.05 | 0.05 | 0.05 |

[1]Irganox B225 is a blend of 1 part Irganox-1010 stabilizer and 1 part Irgafos phosphite, commercially available from Ciba Specialty Chemicals Corporation.

The color dispersion test results for Control Example 17 and Examples 18–26 are set forth in Table VIII.

TABLE VIII

| Ex. | L | a | b | Delta L | Delta a | Delta b |
|---|---|---|---|---|---|---|
| Control Ex. 17 | 42.738 | 43.649 | 28.255 | | | |
| 18 | 43.443 | 45.057 | 29.429 | 0.705 | 1.408 | 1.174 |
| 19 | 43.368 | 44.854 | 29.321 | 0.63 | 1.205 | 1.066 |
| 20 | 43.222 | 44.821 | 29.255 | 0.484 | 1.172 | 1 |
| 21 | 43.212 | 44.629 | 29.24 | 0.474 | 0.98 | 0.985 |
| 22 | 43.158 | 44.463 | 29.133 | 0.42 | 0.814 | 0.878 |
| 23 | 42.847 | 43.945 | 28.779 | 0.109 | 0.296 | 0.524 |
| 24 | 43.38 | 44.975 | 29.38 | 0.642 | 1.326 | 1.125 |
| 25 | 43.406 | 45.064 | 29.492 | 0.668 | 1.415 | 1.237 |
| 26 | 43.119 | 44.229 | 29.112 | 0.381 | 0.58 | 0.857 |

The color dispersion test results for Control Example 33 and Examples 27-32 and 34–38 are set forth in Table IX.

TABLE IX

| Ex. | L | A | b | Delta L | Delta a | Delta b |
|---|---|---|---|---|---|---|
| Control Ex. 33 | 44.55 | 47.42 | 30.96 | | | |
| 27 | 44.72 | 47.58 | 31.25 | 0.17 | 0.16 | 0.29 |
| 28 | 45.07 | 48.68 | 32.00 | 0.52 | 1.26 | 1.04 |
| 29 | 44.54 | 47.55 | 31.04 | −0.01 | 0.13 | 0.08 |
| 30 | 44.71 | 47.47 | 31.35 | 0.16 | 0.05 | 0.39 |
| 31 | 44.27 | 47.29 | 30.94 | −0.28 | −0.13 | −0.02 |
| 32 | 43.89 | 46.34 | 30.27 | −0.66 | −1.08 | −0.69 |
| 34 | 44.66 | 47.49 | 31.17 | 0.11 | 0.07 | 0.21 |
| 35 | 44.59 | 47.36 | 31.08 | 0.04 | −0.06 | 0.12 |
| 36 | 44.29 | 46.86 | 30.75 | −0.26 | −0.56 | −0.21 |
| 37 | 44.01 | 46.64 | 30.51 | −0.54 | −0.78 | −0.45 |
| 38 | 43.92 | 46.17 | 30.30 | −0.63 | −1.25 | −0.66 |

In the color measurements, higher "Delta a" values reflect a richer red color relative to a propylene homopolymer control. As shown by the data in Tables VIII and IX, the use of the irradiated, oxidized propylene polymer dispersants of this invention permit a reduction in the pigment level required to maintain a base color intensity.

Compositions were prepared using Cabot 800 carbon black, commercially available from Cabot Corporation, to evaluate dispersion in a propylene homopolymer commercially available from Basell USA Inc. A 25 mm Berstoff twin screw extruder commercially available from Berstorff Ltd was used for compounding the compositions.

The composition and extrusion conditions for Control Example 39 and Examples 40–43 are set forth in Table X.

TABLE X

| Examples | Control Ex.39 | 40 | 41 | 42 | 43 |
|---|---|---|---|---|---|
| Non-irradiated, non-oxidized propylene homo polymer, wt % MFR = 12.6, I.I. = 95% | 98.84 | 96.87 | 93.90 | 88.96 | 79.07 |
| Irradiated, oxidized propylene of Example 8, wt % | | 1.98 | 4.94 | 9.88 | 19.77 |
| Carbon Black, Cabot 800, wt % | 0.99 | 0.99 | 0.99 | 0.99 | 0.99 |
| Irganox B225 antioxidant[1], wt % | 0.12 | 0.12 | 0.12 | 0.12 | 0.12 |
| Calcium stearate, wt % | 0.05 | 0.05 | 0.05 | 0.05 | 0.05 |
| 25 mm Berstorff extruder conditions: | | | | | |
| Barrel temperature, °C. | 232.2 | 232.2 | 232.2 | 232.2 | 232.2 |
| Screw speed, r.p.m. | 120 | 120 | 120 | 120 | 120 |

[1]Irganox B225 is a blend of 1 part Irganox-1010 stabilizer and 1 part Irgafos phosphite, commercially available from Ciba Specialty Chemicals Corporation.

The color dispersion test results for Control Example 39 and Examples 40–43 are set forth in Table XI.

TABLE XI

| Ex. | L | a | b | Delta L | Delta a | Delta b |
|---|---|---|---|---|---|---|
| Control Ex. 39 | 26.20 | 0.00 | 0.22 | | | |
| 40 | 26.10 | −0.02 | 0.09 | −0.10 | −0.02 | −0.13 |
| 41 | 26.14 | −0.04 | 0.02 | −0.06 | −0.04 | −0.20 |
| 42 | 26.07 | −0.07 | −0.11 | −0.13 | −0.07 | −0.33 |
| 43 | 25.94 | −0.10 | −0.28 | −0.26 | −0.10 | −0.5 |

In the color measurements, a higher negative value for "Delta L" reflects a richer black color relative to a propylene homopolymer control. As shown by the data in Table XI, the use of the irradiated, oxidized propylene polymer dispersants of this invention provide improved color intensity for carbon black.

Compositions were prepared using pentabromophenyl ether and antimony oxide, or Fryebloc flame retardant concentrate as flame retardant additives. Fryebloc flame retardant concentrate, commercially available from Great Lake Chemical Corporation, is a flame retardant concentrate containing 60 weight % pentabromophenyl ether, 20 weight % antimony oxide and 20 weight % of a carrier. Irganox B225 antioxidant, a blend of 1 part Irganox-1010 stabilizer and 1 part Irgafos phosphite, commercially available from Ciba Chemical Specialties Company, was used as a processing stabilizer, and calcium stearate was used as an acid scavenger.

All ingredients were dry-blended and compounded in a co-rotating intermeshing Leistritz LSM 34 GL twin-screw extruder, commercially available from American Leistritz Extruder Corp., USA. Extrusion temperatures were at 230° C. for all zones, with a throughput of 11.34 kg/hr., and screw speed of 250 rpm. All materials were injection-molded on a Battenfeld injection-molding machine into flex bars with dimensions of 127 mm±5 mm, by 13 mm±0.5 mm, by 3.13 mm±0.05 mm. Flammability tests were conducted on the injection-molded material using Underwriters Laboratories Inc. UL-94 procedure for vertical test burning. The total burn time set forth in Tables XII–XVI represents the sum of time that five individually tested flex bars burned.

The composition and flammability test results for Control Example 44 and Examples 45–46 are set forth in Table XII.

TABLE XII

| Examples | Control Ex. 44 | 45 | 46 |
|---|---|---|---|
| Non-irradiated, non-oxidized propylene homopolymer, wt %; MFR = 4.6, I.I = 95% | 96.5 | 86.9 | 91.7 |
| Irradiated, oxidized propylene of Example 6, wt % | | 9.6 | 4.8 |
| Pentabromophenyl ether, wt % | 2.4 | 2.4 | 2.4 |
| Antimony (III) oxide, wt % | 0.8 | 0.8 | 0.8 |
| Irganox B225 antioxidant, wt % | 0.2 | 0.2 | 0.2 |
| Calcium stearate, wt % | 0.1 | 0.1 | 0.1 |
| Flammability Results: | | | |
| UL-94 flammability test | Fail | V-2 | V-2 |
| Total burn time after 1st and 2nd ignition (seconds) | — | 52 | 73 |

The composition and flammability test results for Examples 47–49 are set forth in Table XIII.

TABLE XIII

| Examples | 47 | 48 | 49 |
|---|---|---|---|
| Non-irradiated, non-oxidized propylene homopolymer, wt %; MFR = 4.6, I.I. = 95% | 85.7 | 85.7 | 85.7 |
| Fyrebloc 5DB-380Y9 concentrate, wt % | 9 | 9 | 9 |
| Irradiated, oxidized propylene of Example 4, wt % | 5 | | |
| Irradiated, oxidized propylene of Example 5, wt % | | 5 | |
| Irradiated, oxidized propylene of Example 6, wt % | | | 5 |
| Irganox B225 antioxidant, wt % | 0.2 | 0.2 | 0.2 |
| Calcium stearate, wt % | 0.1 | 0.1 | 0.1 |
| Flammability Results: | | | |
| UL-94 flammability test | V-2 | V-2 | V-2 |
| Total Burn time after 1st and 2nd ignition (seconds) | 47 | 41 | 37 |
| MFR, dg/min | 6.4 | 7.3 | 25 |

As demonstrated by burn time data in the Tables XII and XIII, increasing the oxygen-containing functionality and MFR of the irradiated, oxidized propylene polymer dispersants of the invention, or the concentration of same enhances the flame retardancy of the compositions.

The composition and flammability test results for Control Examples 50 and 53, and Examples 51–52 are set forth in Table XIV.

TABLE XIV

| Examples | Control Ex. 50 | 51 | 52 | Control Ex. 53 |
|---|---|---|---|---|
| Non-irradiated non-oxidized propylene homopolymer, wt %; MFR = 12.6, I.I. = 95% | 88.2 | | 79.4 | 79.4 |
| Irradiated, oxidized propylene of Example 4, wt % | | 88.2 | | |
| Irradiated, oxidized propylene of Example 5, wt % | | | 8.8 | |
| Non-irradiated, non-oxidized, propylene homopolymer, MFR = 400, I.I = 97.5%, wt % | | | | 8.8 |
| Pentabromophenyl ether, wt % | 8.8 | 8.8 | 8.8 | 8.8 |
| Antimony (III) oxide, wt % | 2.7 | 2.7 | 2.7 | 2.7 |
| Irganox B225 antioxidant, wt % | 0.2 | 0.2 | 0.2 | 0.2 |
| Calcium stearate, wt % | 0.1 | 0.1 | 0.1 | 0.1 |
| Flammability Results: | | | | |
| UL-94 flammability test | V-2 | V-2 | V-2 | V-2 |

TABLE XIV-continued

| Examples | Control Ex. 50 | 51 | 52 | Control Ex. 53 |
|---|---|---|---|---|
| Total burn time after 1st and 2nd ignition (seconds) | 63 | 16 | 33 | 49 |
| MFR, dg/min | | 20 | 60 | 29 | 23 |

The burn time data in Table XIV shows that compositions containing the irradiated, oxidized dispersants of the invention enhanced the dispersion of the additives relative to the controls.

The composition and flammability test results for Control Examples 54–56 and Examples 57–59 are set forth in Table XV.

TABLE XV

| | Examples | | | | | |
|---|---|---|---|---|---|---|
| | Control Ex. 54 | Control Ex. 55 | Control Ex. 56 | 57 | 58 | 59 |
| Non-irradiated, non-oxidized, propylene homopolymer, wt % MFR = 12.6, I.I. = 95% | 96.5 | 92.3 | 89 | 86.8 | 83.1 | 80.1 |
| Irradiated, oxidized propylene of Example 1, wt % | | | | 9.7 | 9.2 | 8.9 |
| Pentabromophenyl ether, wt % | 2.4 | 5.5 | 8.0 | 2.4 | 5.5 | 8.0 |
| Antimony (III) oxide, wt % | 0.8 | 1.9 | 2.7 | 0.8 | 1.9 | 2.7 |
| Irganox B225 antioxidant, wt % | 0.2 | 0.2 | 0.2 | 0.2 | 0.2 | 0.2 |
| Calcium stearate, wt % | 0.1 | 0.1 | 0.1 | 0.1 | 0.1 | 0.1 |
| Flammability Results: | | | | | | |
| UL-94 flammability test | Fail | V-2 | V-2 | V-2 | V-2 | V-2 |
| Total burn time after 1st and 2nd ignition (seconds) | 502 | 51 | 46 | 39 | 22 | 14 |

As is evident from the data in Table XV, Control Examples 54–56 and Examples 57–59 show that one can achieve a base flame retardance performance level at a lower flame retardant concentration using the irradiated, oxidized olefin polymer dispersants of the invention.

Compositions were prepared using an NA960-000 low density polyethylene, with a density of 0.919 and MFR of 0.9, commercially available from Equistar Chemicals LP, pentabromophenyl ether and antimony oxide. Irganox B225 antioxidant, a blend of 1 part Irganox-1010 stabilizer and 1 part Irgafos phosphite, commercially available from Ciba Chemical Specialties Company was used as a processing stabilizer, and calcium stearate was used as an acid scavenger. All ingredients were dry-blended and compounded in a co-rotating intermeshing Leistritz LSM 34 GL twin-screw extruder, commercially available from American Leistritz Extruder Corp., USA. Extrusion temperatures were at 190° C. for all zones, with a throughput of 11.34 kg/hr., and screw speed of 250 rpm. All materials were injection-molded on a Battenfeld injection-molding machine into flex bars with dimensions of 127 mm±5 mm, by 13 mm±0.5 mm, by 3.13 mm±0.05 mm. Flammability tests were conducted on the injection-molded material using Underwriters Laboratories Inc. UL-94 procedure for vertical test burning. The total burn time set forth in Table XVI represents the sum of time that five individually tested flex bars burned.

The compositions and flammability test results for Control Example 60 and Example 61 are set forth in Table XVI.

TABLE XVI

| Examples | Control Ex. 60 | 61 |
|---|---|---|
| Non-irradiated, non-oxidized polyethylene[1], wt % | 92.3 | 83.1 |
| Irradiated, oxidized ethylene of Example 7, wt % | | 9.2 |
| Pentabromophenyl ether, wt % | 5.5 | 5.5 |
| Antimony (III) oxide, wt % | 1.9 | 1.9 |
| Irganox B225 antioxidant, wt % | 0.2 | 0.2 |
| Calcium stearate, wt % | 0.1 | 0.1 |

TABLE XVI-continued

| Examples | Control Ex. 60 | 61 |
|---|---|---|
| Flammability Results: | | |
| UL-94 flammability test | V-2 | V-2 |
| Total burn time after 1st and 2nd ignition (seconds) | 21 | 7 |

[1]NA960-000.

As is evident from the burn time data of Table XVI, the irradiated, oxidized ethylene polymer dispersant of the invention improves the flame retardancy of the ethylene homopolymer composition.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. An additive-containing olefin polymer composition comprising:
   A. 2.0 to 30.0 wt % of an irradiated, oxidized olefin polymer material;

B. 0.1 to 40.0 wt % of an additive selected from the group consisting of colorants, halogenated flame retardants, conductive carbon black, anti-microbial agents, anti-acids and mixtures thereof; and C. 30.0 to 97.9 wt % of a non-irradiated, non-oxidized olefin polymer material; wherein the sum of components A+B+C is equal to 100 wt %.

2. The composition of claim 1 wherein component A and component C are selected from the group consisting of:

(a) a crystalline homopolymer of propylene having an isotactic index greater than 80%;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and when ethylene is one of the olefins, the maximum polymerized ethylene content is 5% by weight;

(d) an olefin polymer composition comprising:
 (i) 10 parts to 60 parts by weight of a crystalline propylene homopolymer having an isotactic index at least 80%, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, and an isotactic index greater than 60%;
 (ii) 3 parts to 25 parts by weight of a copolymer of ethylene and propylene or a $C_4$–$C_8$ α-olefin that is insoluble in xylene at ambient temperature; and
 (iii) 10 parts to 80 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing 0.5% to 10% by weight of a diene, and containing less than 70% by weight of ethylene, and being soluble in xylene at ambient temperature and having an intrinsic viscosity of 1.5 to 4.0 dl/g;
the total of (ii) and (iii), based on the total olefin polymer composition being from 50% to 90%, and the weight ratio of (ii)/(iii) being less than 0.4, wherein the composition is prepared by polymerization in at least two stages;

(e) a thermoplastic olefin comprising:
 (i) 10% to 60% of a propylene homopolymer having an isotactic index at least 80%, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 60%;
 (ii) 20% to 60% of an amorphous copolymer selected from the group consisting of (a) ethylene and propylene, (b) ethylene, propylene, and a $C_4$–$C_8$ α-olefin, and (c) ethylene and a α-olefin, the copolymer optionally containing 0.5% to 10% of a diene, and containing less than 70% ethylene and being soluble in xylene at ambient temperature; and
 (iii) 3% to 40% of a copolymer of ethylene and propylene or an α-olefin that is insoluble in xylene at ambient temperature;

(f) homopolymers of ethylene;

(g) random copolymers of ethylene and an alph-olefin selected from the group consisting of $C_{3-10}$ alpha-olefins having a maximum polymerized alpha-olefin content of 20 wt %;

(h) random terpolymers of ethylene and $C_{3-10}$ alpha-olefins having a maximum polymerized alpha-olefin content of 20 wt %;

(i) homopolymers of butene-1;

(j) copolymers or terpolymers of butene-1 with a non-butene alpha-olefin comonomer content from 1 to 15 mole %; and (k) mixtures thereof.

3. The composition of claim 2 wherein the non-irradiated, non-oxidized olefin polymer is a crystalline homopolymer of propylene having an isotactic index greater than 80%.

4. The composition of claim 2 wherein the irradiated, oxidized olefin polymer starting material is a crystalline homopolymer of propylene having an isotactic index greater than 80%.

5. The composition of claim 1 wherein the irradiated, oxidized olefin polymer is produced by a process comprising:

a. irradiating a non-irradiated, non-oxidized olefin polymer starting material under a blanket of an inert gas, thereby producing an irradiated olefin polymer material;

b. adding a controlled amount of oxygen to expose the irradiated olefin polymer material to a first active oxygen concentration greater than 0.004% but less than 15% by volume, at a first temperature of from 25° C. to a temperature below the softening point of the irradiated olefin polymer material; and c. heating the irradiated, oxidized olefin polymer material of step (b) to a second temperature of from at least 25° C. to a temperature below the softening point of the irradiated, oxidized olefin polymer material of step (b), while adding a controlled amount of oxygen to expose the irradiated, oxidized olefin polymer material of step (b) to a second controlled active oxygen concentration greater than 0.004%, but less than 15% by volume.

6. The composition of claim 1 wherein the additive is a colorant present in an amount from 0.1 to 5.0 wt %.

7. The composition of claim 1 wherein the additive is a halogenated flame retardant composition comprising a halogenated compound first component present in an amount from 2.0 to 30 wt %, and a second component selected from the group consisting of antimony trioxide, boron compounds, tin oxide, zinc oxide, zinc borate, aluminum trioxide, aluminum trihydroxide and mixtures thereof, present in an amount from 0.5 to 10 wt %.

8. An additive concentrate composition comprising:

A. 9.0 to 85.0 wt % of an additive selected from the group consisting of colorants, halogenated flame retardants, conductive carbon black, anti-microbial agents, anti-acids and mixtures thereof; and B. 91.0 to 15.0 wt % of an irradiated, oxidized, olefin polymer material;

wherein the sum of components A±B is equal to 100 wt %.

9. The composition of claim 8 wherein the irradiated, oxidized olefin polymer starting material is produced from a non-irradiated, non-oxidized olefin polymer starting material comprising:

(a) a crystalline homopolymer of propylene having an isotactic index greater than 80%;

(b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight;

(c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight;

(d) an olefin polymer composition comprising:
  (i) 10 parts to 60 parts by weight of a crystalline propylene homopolymer having an isotactic index at least 80%, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight, and an isotactic index greater than 60%;
  (ii) 3 parts to 25 parts by weight of a copolymer of ethylene and propylene or a $C_4$–$C_8$ α-olefin that is insoluble in xylene at ambient temperature; and
  (iii) 10 parts to 80 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing 0.5% to 10% by weight of a diene, and containing less than 70% by weight of ethylene, and being soluble in xylene at ambient temperature and having an intrinsic viscosity of 1.5 to 4.0 dl/g;

the total of (ii) and (iii), based on the total olefin polymer composition being from 50% to 90%, and the weight ratio of (ii)/(iii) being less than 0.4, wherein the composition is prepared by polymerization in at least two stages; and (e) a thermoplastic olefin comprising:
  (i) 10% to 60% of a propylene homopolymer having an isotactic index at least 80%, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 60%;
  (ii) 20% to 60% of an amorphous copolymer selected from the group consisting of (a) ethylene and propylene, (b) ethylene, propylene, and a $C_4$–$C_8$ α-olefin, and (c) ethylene and an α-olefin, the copolymer optionally containing about 0.5% to about 10% of a diene, and containing less than 70% ethylene and being soluble in xylene at ambient temperature; and
  (iii) about 3% to about 40% of a copolymer of ethylene and propylene or an α-olefin that is insoluble in xylene at ambient temperature.

(f) homopolymers of ethylene;

(g) random copolymers of ethylene and an alpha-olefin selected from the group consisting of $C_{3-10}$ alpha olefins having a maximum polymerized alpha-olefin content of 20 wt %;

(h) random terpolymers of ethylene and $C_{3-10}$ alpha olefins having a maximum polymerized alpha-olefin content of 20 wt %;

(i) homopolymers of butene-1;

(j) copolymers or terpolymers of butene-1 with a non-butene alpha-olefin comonomer content from 1 to 15 mole %; and (k) mixtures thereof.

10. The composition of claim 9, wherein the olefin polymer starting material is a crystalline homopolymer of polypropylene having an isotactic index of greater than 80%.

11. The composition of claim 9, wherein the irradiated, oxidized olefin polymer is produced by a process comprising:

a. irradiating the non-irradiated, non-oxidized olefin polymer starting material under a blanket of an inert gas, thereby producing an irradiated olefin polymer material;

b. adding a controlled amount of oxygen to expose the irradiated olefin polymer material to a first active oxygen concentration greater than 0.004% but less than 15% by volume, at a first temperature of from 25° C. to a temperature below the softening point of the irradiated olefin polymer material; and c. heating the irradiated, oxidized olefin polymer material of step (b) to a second temperature of from at least 25° C. to a temperature below the softening point of the irradiated, oxidized olefin polymer material of step (b), while adding a controlled amount of oxygen to expose the irradiated, oxidized olefin polymer material of step (b) to a second active oxygen concentration greater than 0.004%, but less than 15% by volume.

12. The composition of claim 8 wherein the additive is a colorant present in an amount from 10 to 70 wt %.

13. The composition of claim 8 wherein the additive is a halogenated flame retardant composition comprising a halogenated compound first component present in an amount from 7 to 65 wt %, and a second component selected from the group consisting of antimony trioxide, boron compounds, tin oxide, zinc oxide, zinc borate, aluminum trioxide, aluminum trihydroxide, and mixtures thereof present in an amount from 2.0 to 20 wt %.

* * * * *